(12) United States Patent
Liu et al.

(10) Patent No.: US 11,662,486 B2
(45) Date of Patent: May 30, 2023

(54) RADIATION WINDOW

(71) Applicant: Oxford Instruments Technologies Oy, Espoo (FI)

(72) Inventors: Zhengjung Liu, Espoo (FI); Nikolai Chekurov, Helsinki (FI)

(73) Assignee: Oxford Instruments Technologies Oy, Espoo (FI)

( * ) Notice: Subject to any disclaimer, the term of this patent is extended or adjusted under 35 U.S.C. 154(b) by 66 days.

(21) Appl. No.: 17/598,364

(22) PCT Filed: Mar. 17, 2020

(86) PCT No.: PCT/FI2020/050167
§ 371 (c)(1),
(2) Date: Sep. 27, 2021

(87) PCT Pub. No.: WO2020/193850
PCT Pub. Date: Oct. 1, 2020

(65) Prior Publication Data
US 2022/0155473 A1     May 19, 2022

(30) Foreign Application Priority Data
Mar. 27, 2019 (FI) ..................................... 20195237

(51) Int. Cl.
*G01T 7/00* (2006.01)
*C01B 32/05* (2017.01)
(Continued)

(52) U.S. Cl.
CPC ................ *G01T 7/00* (2013.01); *C01B 32/05* (2017.08); *C01B 33/02* (2013.01); *C01B 33/20* (2013.01)

(58) Field of Classification Search
CPC ........... G01T 7/00; C01B 32/05; C01B 33/02; C01B 33/20; H01J 5/18; H01J 35/18; H01J 47/004; H01L 21/31144
See application file for complete search history.

(56) References Cited

U.S. PATENT DOCUMENTS

| 4,862,490 A | 8/1989 | Karnezos et al. |
| 4,939,763 A | 7/1990 | Pinneo et al. |
| (Continued) | | |

FOREIGN PATENT DOCUMENTS

| DE | 102014103546 A1 | 8/2015 |
| EP | 2727897 A2 | 5/2014 |
| (Continued) | | |

*Primary Examiner* — Kiho Kim
(74) *Attorney, Agent, or Firm* — Laine IP Oy (57) ABSTRACT

According to an example aspect of the present invention, there is provided a radiation window manufacturing method, comprising patterning a mask on a top surface of a bulk wafer or compound wafer, etching the bulk or compound wafer from the top surface, based on the mask, either by timed etching of the bulk wafer, or until an inner insulator layer of the compound wafer, thereby generating recesses in the bulk or compound wafer, filling the recesses, at least partly, with a filling material, polishing the top surface of the bulk or compound wafer, and providing a membrane layer on the polished top surface, and etching the bulk or compound wafer from a bottom surface, opposite the top surface, to build a supporting structure for the membrane layer in accordance with a shape defined by the mask.

19 Claims, 8 Drawing Sheets (51) Int. Cl.
  *C01B 33/02* (2006.01)
  *C01B 33/20* (2006.01)

(56) References Cited

U.S. PATENT DOCUMENTS

| | | |
|---|---|---|
| 7,141,504 B1 | 11/2006 | Bhardwaj |
| 2004/0251431 A1 | 12/2004 | Yamaguchi et al. |
| 2008/0296518 A1 | 12/2008 | Xu et al. |
| 2013/0270446 A1 | 10/2013 | Dardona et al. |
| 2015/0016593 A1 | 1/2015 | Larson et al. |

FOREIGN PATENT DOCUMENTS

| | | | | |
|---|---|---|---|---|
| GB | 2561439 A | 10/2018 | | |
| WO | WO W02011122506 A1 | 10/2011 | | |
| WO | WO-2017168033 A1 * | 10/2017 | ............. | C23C 16/26 |
| WO | WO W02018134480 A1 | 7/2018 | | |

* cited by examiner

RADIATION WINDOW

FIELD

The present invention relates to window constructs that are at least partially transparent to radiation, such as x-rays.

BACKGROUND

Radiation measurement devices operate by determining a reaction of a detector device to incoming radiation. For example, an x-ray camera may receive x-rays and determine their intensity as a function of location on a two-dimensional charge-coupled device, CCD, array. A spectrometer, on the other hand, may be configured to determine spectral characteristics of incoming radiation, for example to determine an astrophysical redshift or to identify characteristic emission peaks of elements to analyse elemental composition of a sample.

When measuring soft x-rays, by which it may be meant, for example, x-rays with energy below about 1 keV, providing the radiation to a detector presents with challenges. For example, air scatters soft x-rays and many materials absorb soft x-rays, wherefore the radiation most conveniently is conveyed to a detector through vacuum, wherein the detector may be placed in the vacuum. Most elements exhibit characteristic emissions above 1 keV.

When operating in atmospheric conditions, a suitable window may be arranged to admit soft x-rays into the vacuum where a detector may be arranged to analyse the radiation. Such a window would ideally be transparent to the soft x-rays and durable of construction, and impermeable to air to protect the detector.

Transparency to x-rays may be increased by reducing the thickness of the window. For example, beryllium windows have been used, wherein the thinner the window is, the larger a fraction of incoming radiation is admitted through the window. On the other hand, the thinner the window is, the likelier it is to break in real-life circumstances.

To increase durability of a window, the window may be reinforced with a supporting structure, such as a mechanical grid, or it may be sandwiched between supporting structures. Supporting structures may take the form of web-like support structures, which partially cover and partially expose the window material. In parts where the window material is exposed by supporting structures, the window is maximally transparent to incoming radiation.

SUMMARY OF THE INVENTION

The invention is defined by the features of the independent claims. Some specific embodiments are defined in the dependent claims.

According to a first aspect of the present invention, there is provided a radiation window manufacturing method, comprising patterning a mask on a top surface of a bulk wafer or compound wafer, etching the bulk or compound wafer from the top surface, based on the mask, either by timed etching of the bulk wafer, or until an inner insulator layer of the compound wafer, thereby generating recesses in the bulk or compound wafer, filling the recesses, at least partly, with a filling material, polishing the top surface of the bulk or compound wafer, and providing a membrane layer on the polished top surface, and etching the bulk or compound wafer from a bottom surface, opposite the top surface, to build a supporting structure for the membrane layer in accordance with a shape defined by the mask.

According to a second aspect of the present invention, there is provided a radiation window construct, comprising a radiation window comprised of a membrane layer, and a supporting structure built of a bulk wafer or a compound wafer, wherein the radiation window construct has been manufactured using a process wherein a filling material has been provided to fill etched recesses in the bulk or compound wafer, wherein grooves are created in corners of the recesses where the membrane layer and material of the bulk or compound wafer meet when polishing the top surface of the bulk or compound wafer.

According to a third aspect of the present invention, there is provided an x-ray detector comprising a radiation window construct in accordance with the second aspect.

EMBODIMENTS

Supporting structures may be built for radiation windows using processes described herein. A filling material is employed into recesses of a wafer, to enable a polishing phase where a structure with enhanced stress resistance is obtained for a window comprised of a membrane layer on the wafer. The wafer may be a bulk wafer. The wafer may alternatively comprise a compound wafer comprising two or more sub-wafers and separate layers between the adjacent sub-wafers. The sub-wafers may be made of silicon, glass or carbon fibre, for example. The layer between the sub-wafers may be comprised of an insulator, for example silicon oxide, silicon nitride or aluminium oxide. Most generally, the layer may be of a material with etching properties which differ from etching properties of the sub-wafers. The compound wafer may comprise a silicon-on-insulator (SOI) wafer, for example. A stress-relieving groove may be obtained in a part of a window structure where the membrane layer meets the silicon wafer, in a corner of a recess.

Radiation windows may benefit from layers deposited thereon, to enhance their desired characteristics, which may include gas impermeability, optical properties or spectral selectivity, for example. To facilitate provision of such layers, radiation windows in accordance with at least some embodiments of the present invention are provided with supporting structures enhancing their structural robustness on one side and the layer or layers on the other side. The side of the radiation window with the layer or layers may be left without a robustness-enhancing supporting structure to facilitate creation of a continuous, high quality layer. Examples of such layers include aluminium, graphene, aluminium oxide, silicon oxide, silicon carbide, nitride films such as aluminium nitride, silicon nitride, boron nitride, titanium nitride, metal-carbo-nitrides such as TiAlCN, pyrolytic carbon, and polymers such as polyimide.

Figure 1:
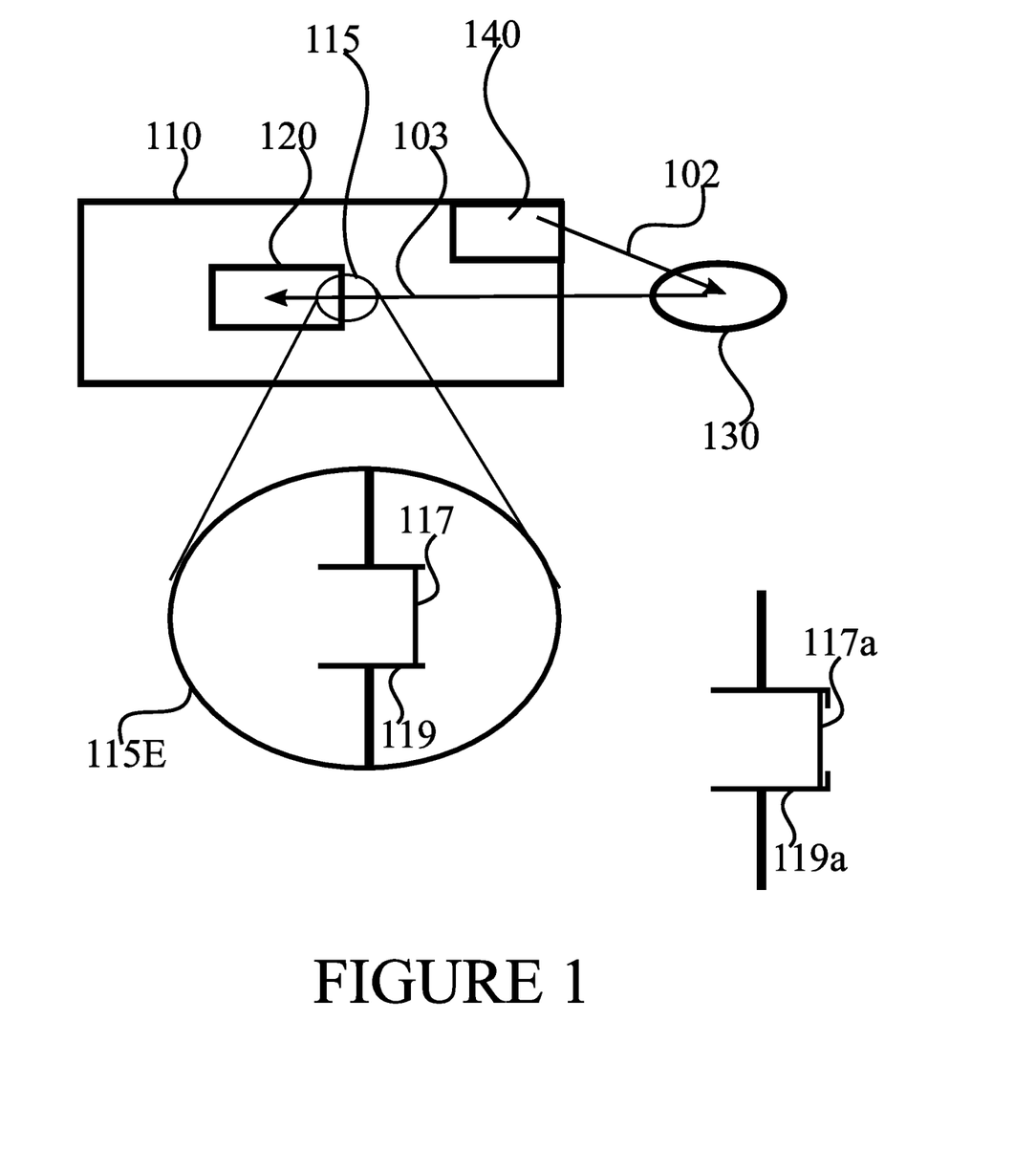
FIG. 1 illustrates an example system capable of being operated with at least some embodiments of the present invention.

FIG. 1 illustrates an example system capable of being operated with at least some embodiments of the present invention. The illustrated system relates to x-ray fluorescence, to which the present invention is not limited, rather, windows built in accordance with the present invention may find application also more broadly.

FIG. 1 illustrates an analytic device 110, which comprises an x-ray detector 120. X-ray detector 120 is in this example configured to determine spectral characteristics of x-rays incident on itself, for example to enable elemental composition analysis based on characteristic emissions.

In use, the arrangement of FIG. 1 irradiates sample 130 with primary radiation 102 from primary x-ray or particle source 140, stimulating matter comprised in sample 130 to emit, via fluorescence, secondary x-ray radiation 103, spectral characteristics of which are determined, at least partly, in x-ray detector 120.

X-ray detector 120 comprises a window region 115, which is arranged to admit x-rays into X-ray detector 120. Window region 115 is illustrated in an enlarged view 115E at the bottom of FIG. 1, wherein a gap in the outer housing of analytic device 110 is shown. Arranged in the gap is an opening wherein a window layer 117 is disposed, preventing inflow of air from outside analytic device 110 to inside analytic device 110 while allowing x-rays, such as, for example, soft x-rays, to enter analytic device 110, so that these x-rays may be analysed in x-ray detector 120. Window layer 117 may be comprised of silicon nitride, for example. Further examples of materials the window layer 117 may be comprised of include aluminium oxide, aluminium nitride, silicon oxide, silicon carbide, titanium oxide, silicon nitride, titanium nitride, metallo-carbo-nitrides such as TiAlCN, boron nitride, boron carbide, boron, beryllium, beryllium oxide, graphene, pyrolytic carbon and polymers, such as polyimide. In some embodiments, window region 115 may be disposed in the housing of analytic device 110, rather than at X-ray detector 120.

Window layer 117 is supported by supporting structure 119 on one side. While illustrated on the inner side facing the inside of X-ray detector 120, supporting structure 119 may, in other embodiments, alternatively be on the outward facing side. Supporting structure 119 may, in some embodiments, be present on one side but not the other side, in other words, supporting structure 119 may be limited to one side of window layer 117. Supporting structure 119 may be comprised of silicon, for example.

While window layer 117 and supporting structure 119 are illustrated in FIG. 1 as slightly separate, with a gap in between, this is for clarity of illustration purposes. In actual embodiments of the invention, window layer 117 may be attached to supporting structure 119, for example by being deposited on a wafer from which supporting structure 119 is constructed. Supporting structure 119 may be constructed by etching, for example.

Supporting structure 119 may take a form and shape that is suitable for supporting window layer 117 thereon, to withstand atmospheric pressure, for example, in case the inside of x-ray detector 120 is maintained at low pressure, or, indeed, vacuum or near-vacuum. For example, supporting structure 119 may comprise a square or rectangular layout, or a spider-web shape, to provide support for window layer 117 while not obscuring too much of window layer 117.

In general, supporting structure 119, attached to window layer 117, will partially obscure and partially expose window layer 117. In detail, a part of window layer 117 touching support structure 119 will be obscured by it, by which it is meant that x-rays passing through window layer 117 will at these places be partially prevented, by support structure 119, from reaching x-ray detector 120. In parts of window layer 117 not touching support structure 119, x-rays that penetrate window layer 117 may proceed directly to x-ray detector 120. The larger the part of window layer 117 touching, and obscured by, supporting structure 119, the stronger is the support provided to window layer 117 and the larger the effect supporting structure 119 has on x-rays incoming through window layer 117. The strength of supporting structure 119 may thus be seen as a trade-off between transmittance through window layer 117 and strength of the radiation window structure which comprises window layer 117 and supporting structure 119. In general, window layer 117 may be completely exposed on a first side and partly exposed on a second side, the supporting structure being on the second side. By completely exposed, or continuously exposed, it is meant window layer 117 is exposed in a manner that an area of window layer 117 in active use is not obstructed by a support structure on the continuously exposed side.

Window layer 117 may be continuous in nature, by which it is meant the layer is not interrupted, for example, in accordance with the support structure. A continuous layer may be planar in the sense that it lies in a single plane.

Window layer 117 may be thin, in the nanometer range, while extending over an opening which is in the order of a few millimetres, or centimeters, in size.

Window layer 117 may have, for example on a side not facing support structure 119, at least one supplementary layer. Examples of supplementary layers include a thin aluminium layer and a graphene layer. An aluminium layer may block, at least partly, visible light from entering through window layer 117. Graphene, on the other hand, may enhance an ability of window layer 117, for example when made of silicon nitride, to prevent gas molecules, such as air, from penetrating through window layer 117. When one side of window layer 117 is clear from supporting structures, such supplementary layers may be applied easier and the resulting layers have fewer defects. This provides the beneficial technical effect that the layers function better in their respective purposes. Supplementary layers may alternatively be referred to as surface layers.

In general, a compound silicon wafer may comprise a construct wherein two or more silicon wafers are attached one on top of one another. There may be a layer or layers arranged in between the silicon wafers comprised in the compound silicon wafer.

FIG. 2A-2F illustrates a manufacturing method in accordance with at least some embodiments of the present invention. The manufacturing method is one which employs a surface filling phase. The process begins at the situation of FIG. 2A, where a compound wafer, such as a silicon on insulator, SOI, wafer is obtained. The compound wafer comprises a first silicon wafer 201 and a second silicon wafer 202, with an insulator layer 212 therein between, as illustrated. The insulator layer may comprise silicon oxide, silicon carbide or boron nitride, for example. The compound wafer is processed to cause mask layers 214 and 217 to form on wafers 202 and 201, respectively, as illustrated. While the layers are herein referred to as silicon oxide layers, in general other materials are usable, as well. In other words, silicon oxide is herein employed as an example material used in a mask layer.

Figure 2A:
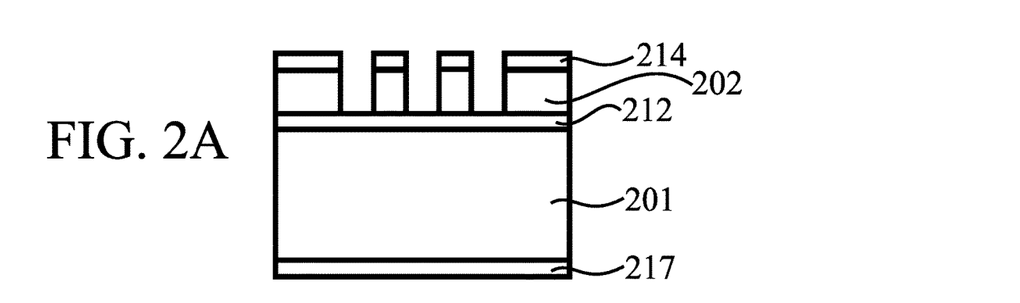
FIGS. 2A-2F illustrates a manufacturing method in accordance with at least some embodiments of the present invention.

In general, the wafers 201, 202 may comprise silicon, carbon fibre or glass wafers, for example, although silicon may be referred to in the present disclosure as an example. Mask layers 214 and 217 may, in general, comprise silicon oxide, aluminium oxide or silicon nitride, for example.

Mask layer 214 is patterned to impart thereon a shape of a supporting structure that is to be constructed for the window layer. Further, silicon wafer 202 has, in the situation illustrated in FIG. 2A, been patterned in accordance with the mask of mask layer 214. This patterning may comprise etching, for example. The patterning extends until the insulator layer 212. As a result of the patterning, recesses are formed into the silicon of silicon wafer 202, as illustrated.

Figure 2B:
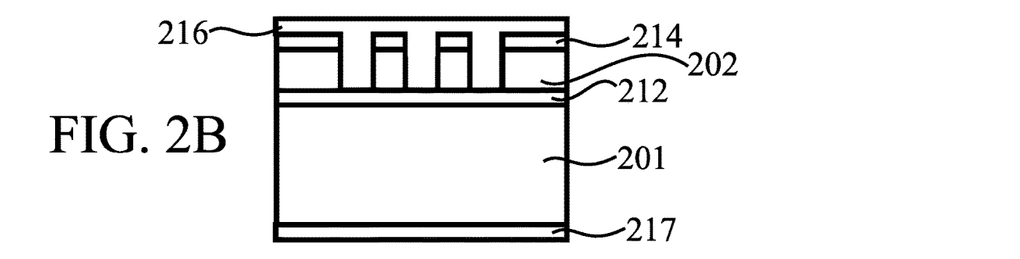

Moving to the phase illustrated in FIG. 2B, the recesses in wafer 202 have been filled with a filling material 216. Examples of suitable filling materials 216, in general and not only relating to FIGS. 2A-2F, include silicon oxide, polysilicon, silicon nitride and spin-coating materials. In general, the filling material may be high temperature resistant or low temperature resistant and capable of being etched away from silicon. Filling material 216 fills the recesses and forms a layer on wafer 202 and mask layer 214. In some embodiments, mask layer 214 is removed before applying the filling material.

Figure 2C:
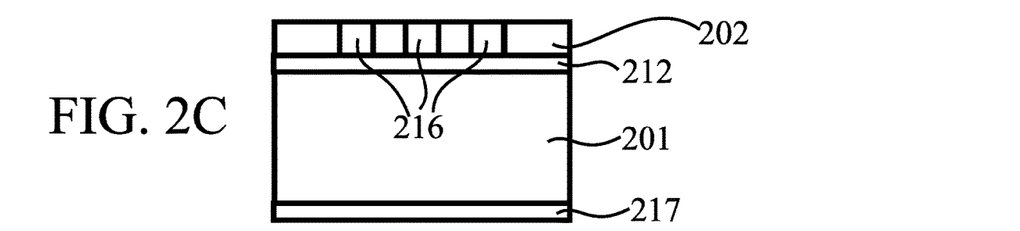
Figure 2D:
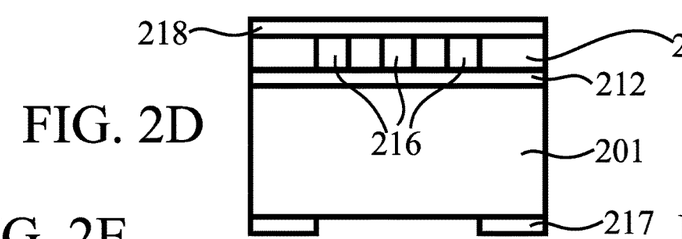

Advancing to the phase illustrated in FIG. 2C, a polishing phase is performed, for example chemical mechanical polishing, to remove the filling material layer extending on wafer 202 and mask layer 214, if it is still present. Thus the top side of the compound wafer will have the recesses, which are filled with the filling material. The top surface of wafer 202 will be polished.

Advancing to the phase illustrated in 2D, a membrane layer 218, forming the x-ray window layer, is applied on the polished surface of wafer 202. The bottom surface side of the compound wafer is patterned by imparting a backside pattern on oxide layer 217. Membrane layer 218 may, in general and not limited to FIGS. 2A-2F, comprise silicon nitride, boron nitride or silicon carbide, for example.

Figure 2E:
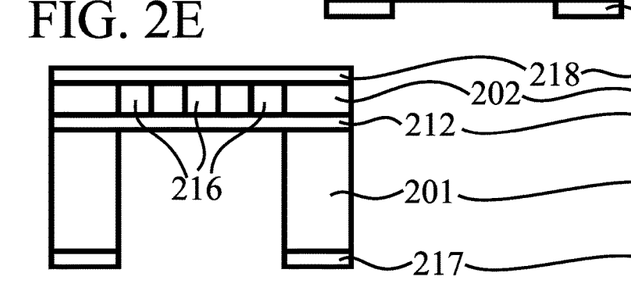
Figure 2F:
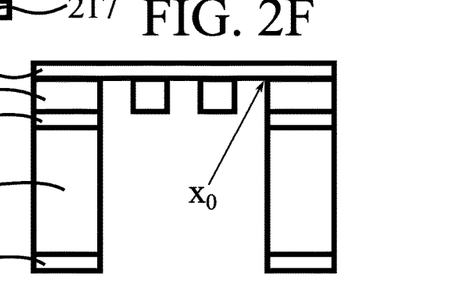

Advancing to the phase illustrated in FIG. 2E, the bottom surface is etched in accordance with the backside pattern, as illustrated, until the insulator layer 212 is reached. Advancing then to the phase illustrated in 2F, the etching from the bottom direction is continued, removing the exposed part of insulator layer 212 and the filling material 216 from the recesses, exposing membrane layer 218, in part, from the bottom side. A supporting structure is thus formed of silicon of wafer 202 on the bottom side of membrane layer 218. The shape and form of the supporting structure is defined by mask layer 214.

As a result of the polishing phase, combined with the removal of the filling material by etching from the backside, small grooves are formed in corners of the recesses connecting with membrane layer 218. One of these corners is illustrated as $x_0$ in FIG. 2F. These grooves provide a beneficial effect in terms of enhancing stress resistance of the resulting window construct, as they enable a small physical deformation of the window constructs.

A variant of the method of FIGS. 2A-2F is one which used a bulk wafer, rather than a compound wafer. A bulk wafer does not have the insulator layer 212 between sub-wafers, and consists therefore of a single wafer. In such an embodiment, the insulator layer 212 is not used as an etch stop, since layer 212 is not present. Rather, the etches may be controlled by controlling the etch time (time controlled etching). The resulting supporting structure may be comprised of the filling material, which is suitably chemically resistant against silicon. Such a bulk wafer process is illustrated in FIGS. 7A-7E. The polishing phase results in similar small grooves as occurs in the compound wafer processes.

FIG. 3B-FIG. 3F illustrate an example manufacturing process in accordance with at least some embodiments of the present invention. In this process, surface filling is used together with a separation layer. Like numbering denotes like structure as in FIGS. 2A-2E.

Figure 3B:
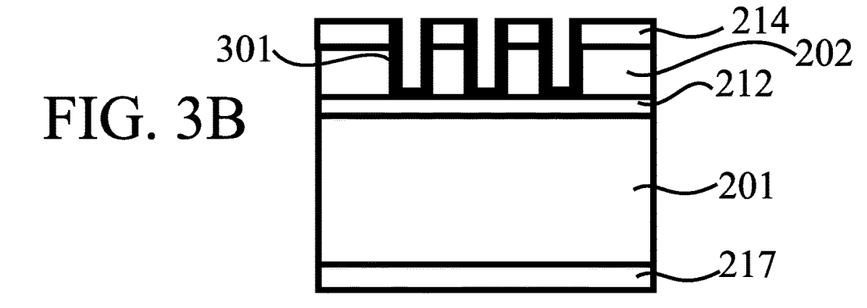
FIGS. 3B-3F illustrates a manufacturing method in accordance with at least some embodiments of the present invention.

The process of FIGS. 3B-3F begins with a phase identical to that of FIG. 2A, wherefore, for the sake of clarity, there is no FIG. 3A. Rather, FIG. 2A may be seen as a first phase of the process of FIGS. 3B-3F. In FIG. 3B, a conformal deposition or growth process, for example a thermal oxidation process, has been performed, resulting in a separation layer 301 coating the recesses in wafer 202. This layer may comprise silicon oxide or aluminium oxide, for example.

Figure 3C:
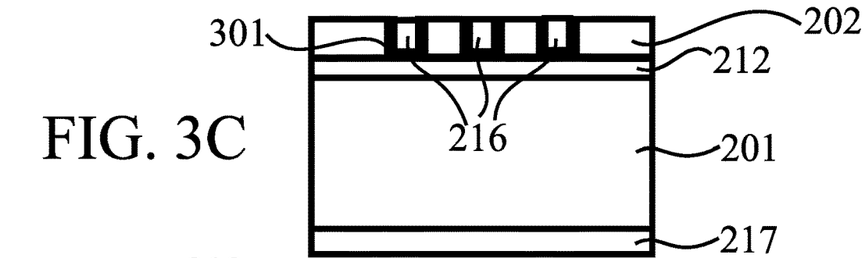

Advancing to the phase illustrated as FIG. 3C, the recesses have been filled with the filling material 216, and a polishing phase, for example similar to the one described in connection with FIG. 2C, has been performed to remove mask layer 214 and the layer of filling material 216 overlying the non-recessed parts of wafer 202. The recesses, coated with separation layer 301, remain filled with filling material 216. The filling material, as described above, may comprise silicon oxide, polysilicon silicon nitride or spin-coating materials, for example.

Figure 3D:
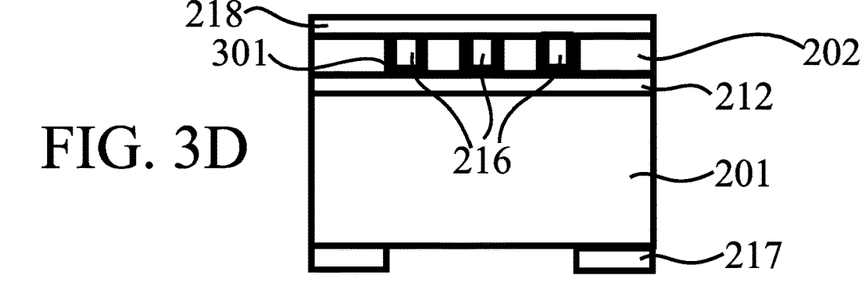

Advancing to the phase illustrated as FIG. 3D, a membrane layer 218, for example of silicon nitride, boron nitride or silicon carbide, has been applied on the polished top surface of the compound wafer. Membrane layer 218 is the window layer, as is described herein above. Further, the bottom surface has been patterned by imparting a bottom pattern to mask layer 217.

Figure 3E:
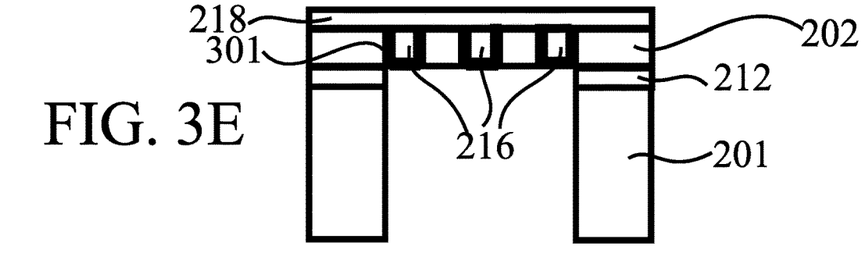
Figure 3F:
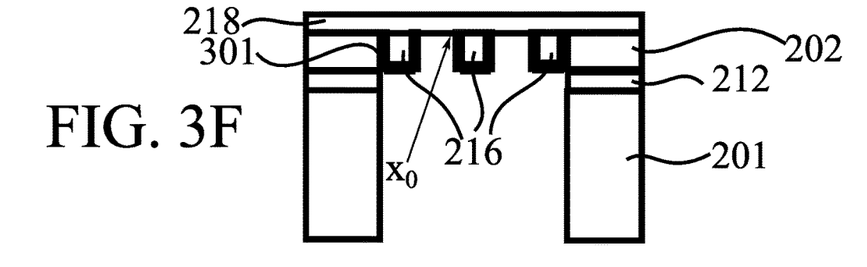

Advancing to the phase illustrated as FIG. 3E, the compound wafer is etched from the bottom side, in accordance with the bottom pattern, to reach the insulator layer 212, and to remove exposed parts of insulator layer 212. Finally, advancing to the phase illustrated as FIG. 3F, etching has continued to remove the exposed matter of wafer 202, until membrane layer 218 is partially exposed also from the bottom side. The supporting structure, in this embodiment, is formed of the filling material 216, coated with separating layer 301. In some embodiments the separating layer is further etched away, wherefore in general the supporting structure is in this embodiment formed of the filling material 216, coated or uncoated by the separating layer 301.

A variant of the method of FIGS. 3B-3F is one which uses a bulk wafer, rather than a compound wafer. A bulk wafer does not have the insulator layer 212 between sub-wafers, and consists therefore of a single wafer. In such an embodiment, the insulator layer 212 is not used as an etch stop, since layer 212 is not present. Rather, the etches may be controlled by controlling the etch time (time controlled etching).

FIG. 4B-FIG. 4F illustrate an example manufacturing process in accordance with at least some embodiments of the present invention. The process uses a buried mask 212 with surface filling.

Figure 4B:
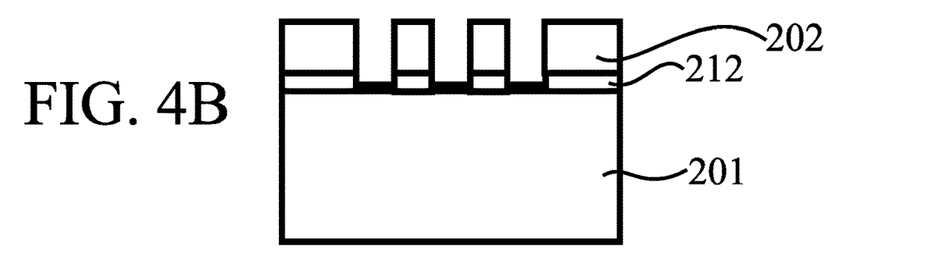
FIGS. 4B-4F illustrates a manufacturing method in accordance with at least some embodiments of the present invention.

The process of FIGS. 4B-4F begins with a phase identical to that of FIG. 2A, wherefore, for the sake of clarity, there is no FIG. 4A. In FIG. 4B, the top and bottom surface mask layers 214, 217 have been removed, and the buried insulator layer 212 has been patterned by partially etching it away such that it is thinner in its exposed parts.

Figure 4C:
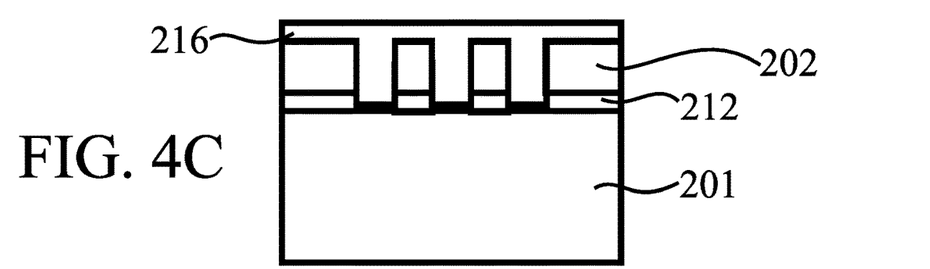
Figure 4D:
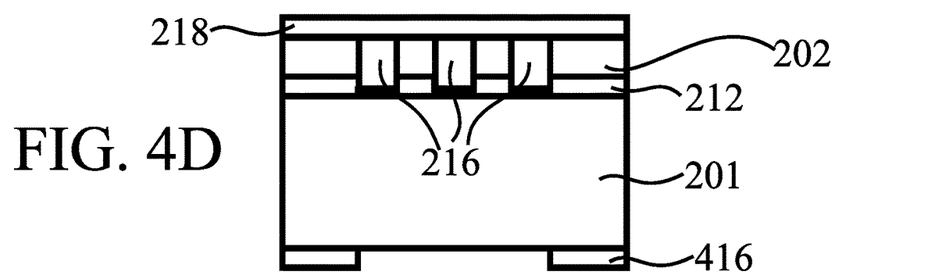

Advancing to the phase illustrated as FIG. 4C, the filling material, described above, is deposited to fill the recesses in wafer 202 of the compound wafer. Advancing to the phase illustrated as FIG. 4D, the polishing operation described above is carried out and the membrane layer 218, for example silicon nitride, boron nitride or silicon carbide, is placed on the polished surface of wafer 202. The recesses remain filled by the filling material 216. A bottom mask 416 is employed to create a bottom pattern. Bottom mask 416 may, in general, be silicon nitride, aluminium oxide or silicon oxide, for example.

Figure 4E:
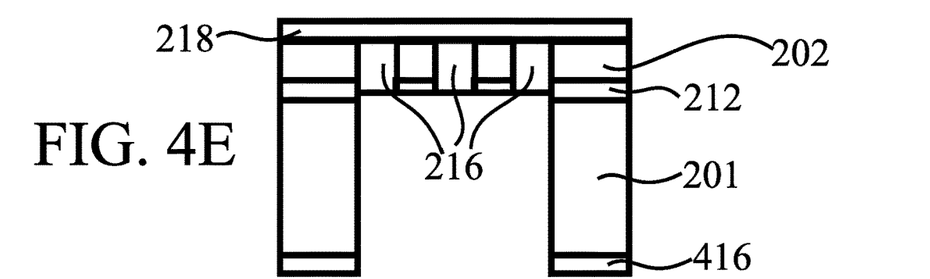

Advancing to the phase illustrated as FIG. 4E, the compound wafer is etched from the bottom side to reach the buried insulator layer 212, and to remove the thinner parts thereof. Thus the filling material filling the recesses is exposed from the bottom side, as are remaining parts of the buried insulator layer 212, coating the parts of wafer 202 which separate the recesses from each other.

Figure 4F:
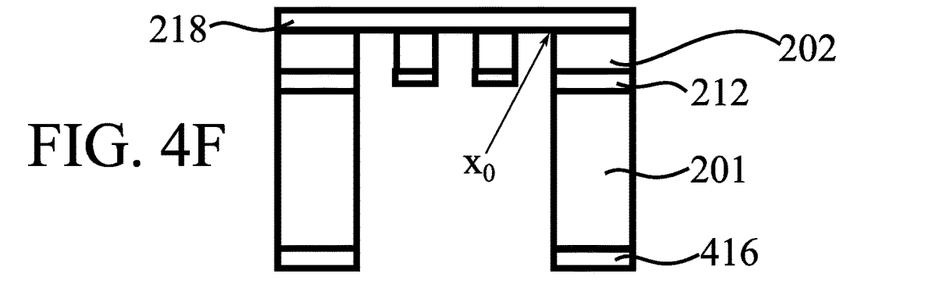

Advancing to the phase illustrated as FIG. 4F, the etching from the bottom side is continued, until membrane layer 218 is partially exposed from the bottom side. The remaining parts of insulator layer 212 may be used as an etch stop in this phase of the etching.

The aforementioned grooves are generated also in the embodiments of FIGS. 4B-4F, in corners of the recesses where membrane layer 218 meets wafer 202. One such corner is indicated as $x_0$ in FIG. 4F.

FIGS. 5B-5E illustrate manufacturing methods resembling those of FIGS. 4B-4F, as will be described now. The method employs a buried mask with surface filling. FIG. 5A is absent, being illustrated as FIG. 2A. As the process advances to the phase illustrated in FIG. 5B, the top and bottom surface mask layers 214, 217 have been removed, and the buried insulator layer 212 has been patterned by etching it away from its exposed parts, such that wafer 201 is exposed through the recesses in wafer 202.

Figure 5B:
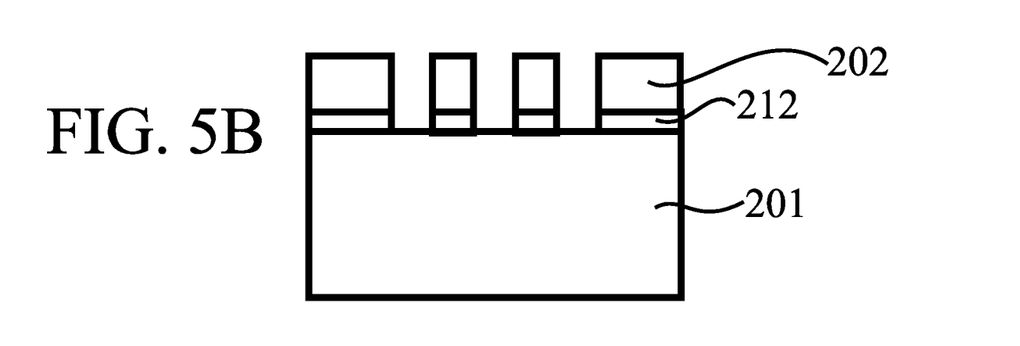
FIGS. 5B-5E illustrates a manufacturing method in accordance with at least some embodiments of the present invention.
Figure 5C:
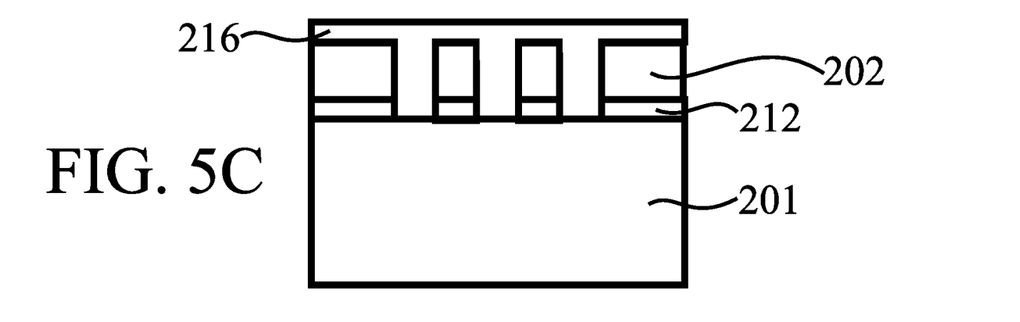

Advancing to the phase illustrated as FIG. 5C, the filling material described above, 216, is applied to fill the recesses and to coat wafer 202, at least partially.

Figure 5D:
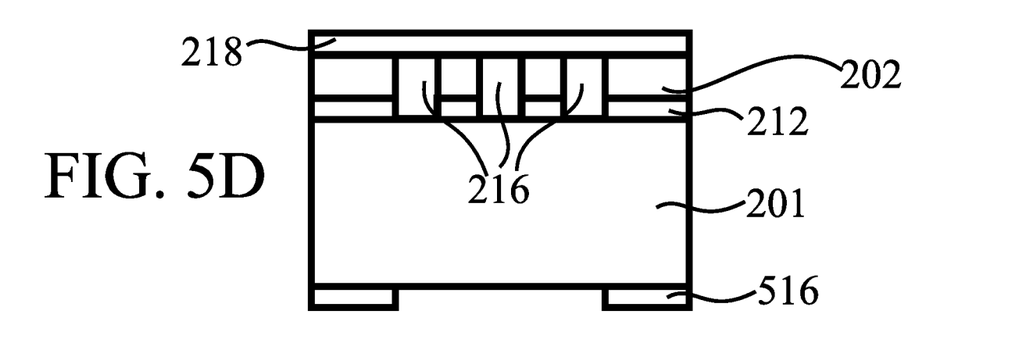

Advancing to the phase illustrated as FIG. 5D, the polishing process is carried out to remove the part of filling material 216 which is not in the recesses and to prepare the top surface of wafer 202 for the membrane layer 218, which is also applied. The membrane layer 218 may comprise silicon nitride, boron nitride or silicon carbide, for example. A bottom mask layer 516 is applied and patterned with a bottom pattern. The bottom mask layer 516 may comprise silicon oxide, aluminium oxide or silicon nitride, for example.

Figure 5E:
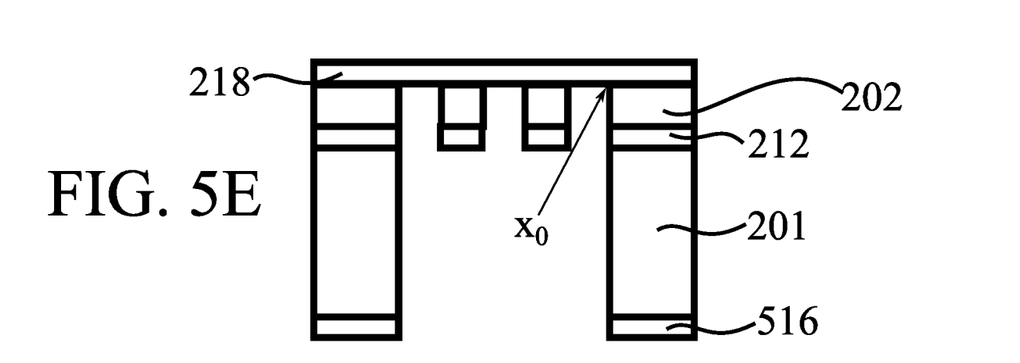

Advancing to the phase illustrated as FIG. 5E, the compound wafer is etched from the bottom side to expose the bottom side of membrane layer 218. Insulator layer 212 may partially be used as an etch stop layer in defining the supporting structure, which is thus constructed of the silicon of wafer 202.

The aforementioned grooves are generated also in the embodiments of FIGS. 5B-5E, in corners of the recesses where membrane layer 218 meets wafer 202. One such corner is indicated as $x_0$ in FIG. 5E.

FIG. 6B-6F illustrate an example manufacturing process in accordance with at least some embodiments of the present invention. This method uses a buried mask with surface filling and a separation layer. FIG. 6A is absent, being illustrated as FIG. 2A. As the process advances to the phase illustrated in FIG. 6B, the top and bottom surface masks have been removed, the buried insulator layer 212 has been etched away where exposed by the recesses, exposing wafer 201 through the recesses, and a conformal deposition or growth process, for example a thermal oxidation process, has been applied to generate a separation layer 301 to coat the insides of the recesses in wafer 202 and on wafer 201.

Figure 6B:
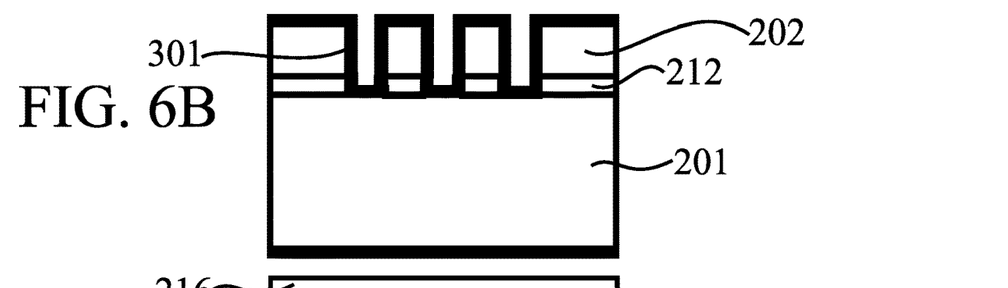
FIGS. 6B-6F illustrates a manufacturing method in accordance with at least some embodiments of the present invention.
Figure 6C:
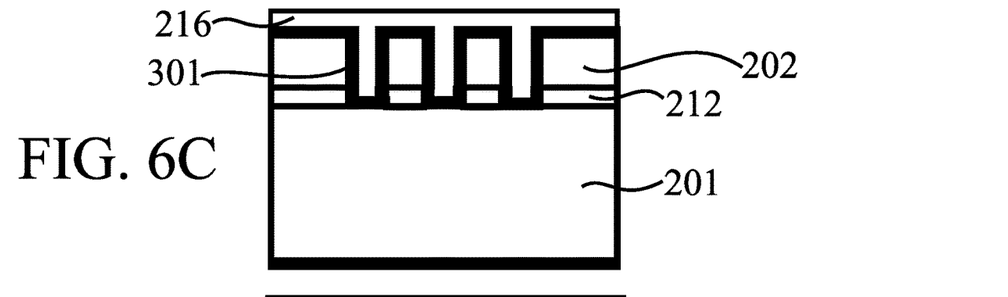

As the process advances to the phase illustrated in FIG. 6C, the filling material, described above, has been deposited on the top surface, filling the recesses and covering the top surface of wafer 202.

Figure 6D:
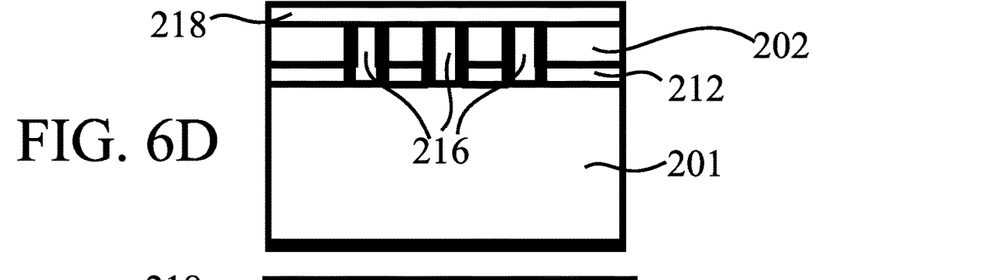

As the process advances to the phase illustrated in FIG. 6D, the top surface is polished, as described above, to remove the filling material which is not in the recesses, and to prepare the surface for membrane layer 218. The membrane layer 218 is, further, deposited on the top surface of the compound wafer, as illustrated. The membrane layer, forming the window layer as in the other embodiments, may comprise silicon nitride, boron nitride or silicon carbide, for example.

Figure 6E:
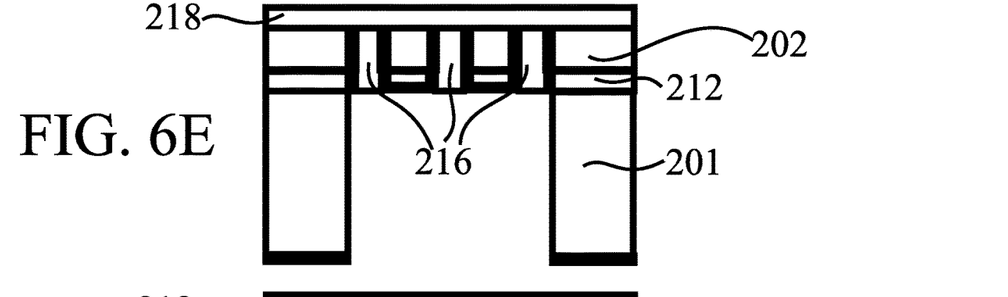

As the process advances to the phase illustrated in FIG. 6E, the bottom surface is provided with a mask layer, which is patterned with a bottom pattern, and the compound wafer is etched from the bottom side, based on the bottom pattern, to expose the buried insulator layer 212 and the filling material 216, which fills the recesses in wafer 202.

Figure 6F:
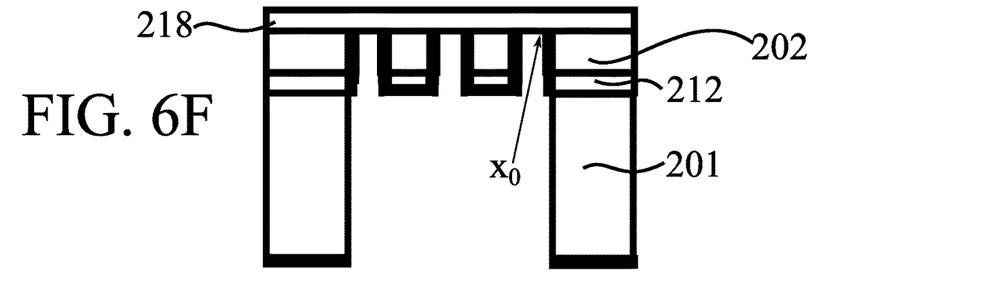
Figure 7A:
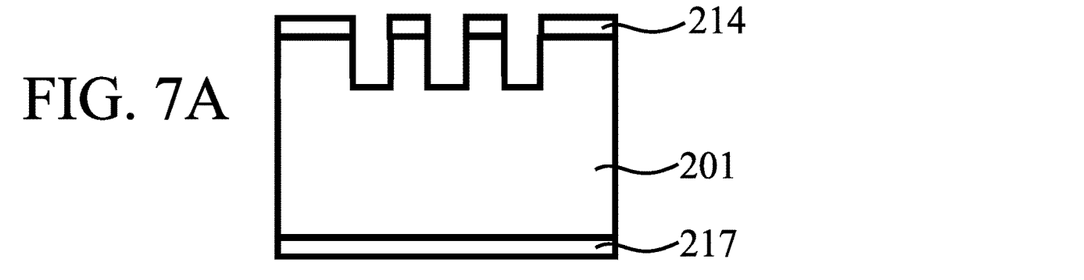
FIGS. 7A-7E illustrate an example bulk wafer process.
Figure 7B:
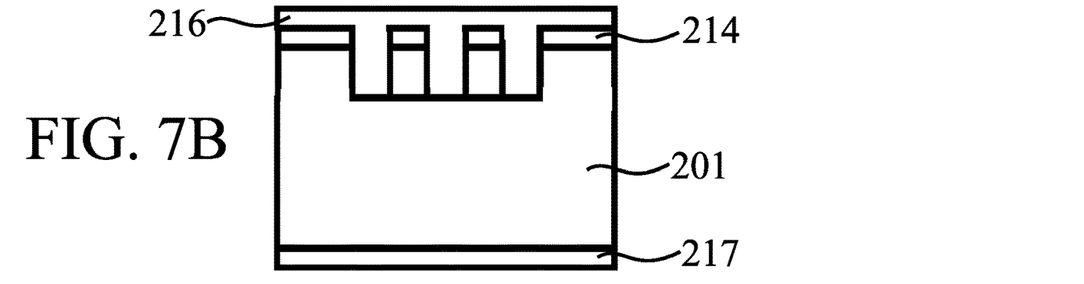
Figure 7C:
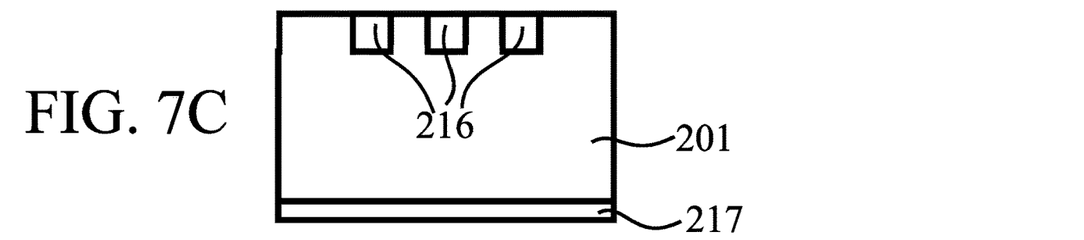
Figure 7D:
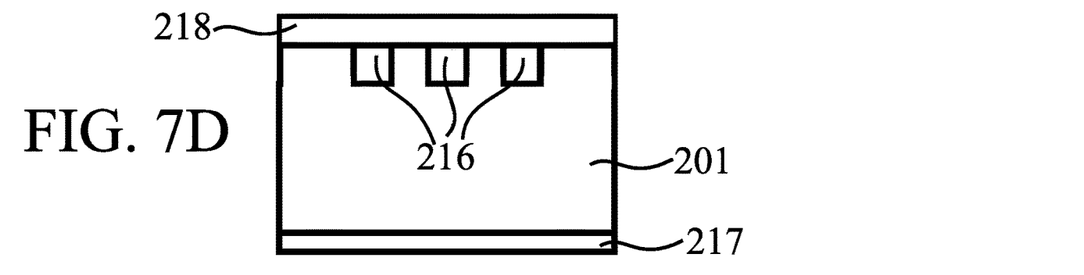
Figure 7E:
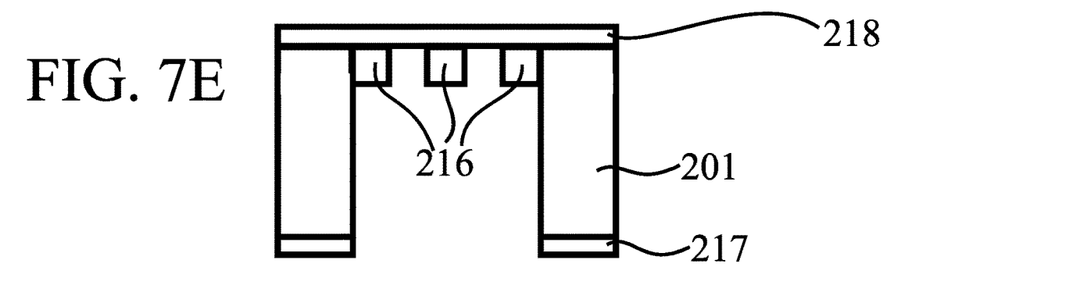

As the process advances to the phase illustrated in FIG. 6F, the etching is continued to remove the filling material 216 and to expose the membrane layer 218 from the bottom side. The supporting structure is thus formed, of the matter of wafer 202, where that material is present between the recesses.

The aforementioned grooves are generated also in the embodiments of FIGS. 6B-6F, in corners of the recesses where membrane layer 218 meets silicon wafer 202. One such corner is indicated as $x_0$ in FIG. 6F.

Figure 8:
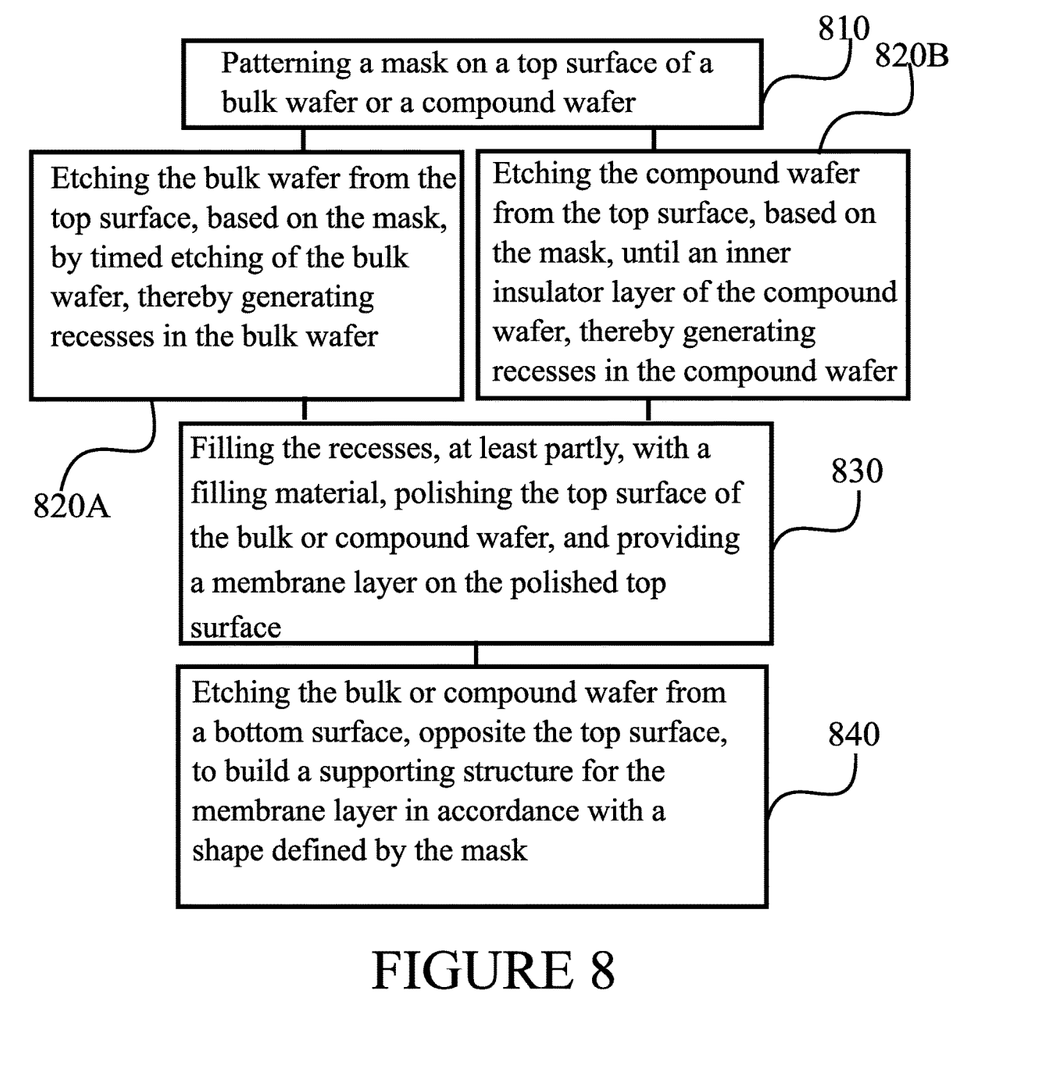
FIG. 8 is a flow graph of a method in accordance with at least some embodiments of the present invention.

FIG. 8 is a flow graph of a method in accordance with at least some embodiments of the present invention.

Phase 810 comprises patterning a mask on a top surface of a bulk wafer or a compound wafer. After phase 810, processing advances to phase 820A in case the wafer is a bulk wafer. In phase 820A, the bulk wafer is etched from the top surface, based on the mask, by timed etching of the bulk wafer, thereby generating recesses in the bulk wafer. In the case of a compound wafer, processing advances from phase 810 to phase 820B, where the compound wafer is etched from the top surface, based on the mask, until an inner insulator layer of the compound wafer, thereby generating recesses in the compound wafer. Etching until the insulator layer may comprise etching until a first surface of the insulator layer is reached, etching until the insulator layer is partly etched away or stopping the etching once the insulator layer had been completely penetrated. Phase 830, following either phase 820A or phase 820B, comprises filling the recesses, at least partly, with a filling material, polishing the top surface of the bulk or compound wafer, and providing a membrane layer on the polished top surface. Finally, phase 840 comprises etching the bulk or compound wafer from a bottom surface, opposite the top surface, to build a supporting structure for the membrane layer in accordance with a shape defined by the mask.

In general, the filling material may be a high temperature resistant material. In low temperature processes, the filling material may comprise a photo resist or other spin-coating materials, for example.

As described herein above, the etching may comprise, for example, a timed etch, an etch stopped at dopant-based etch stop layer, or an etch stopped at a mask layer disposed inside the silicon wafer.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in measurement devices, such as soft x-ray measurement devices, for example.

ACRONYMS LIST

CCD charge-coupled device
keV kiloelectronvolt

REFERENCE SIGNS LIST

| | |
|---|---|
| 110 | Analytic device |
| 120 | X-ray detector |
| 115 | Window region |
| 115E | Window region, enlarged view |
| 117, 117a | Window layer |
| 119, 119a | Supporting structure |
| 130 | Sample |
| 102, 103 | Primary x-rays or electrons, secondary x-rays |
| 201, 202 | Wafer |
| 212 | Insulator layer (e.g. oxide layer) |
| 214, 217 | Mask layer |
| 216 | Filling material |
| 218 | Membrane layer (window layer) |
| 301 | Separation layer |
| 416, 516 | Bottom mask layer |
| 810-840 | Phases of the method of FIG. 8 |

The invention claimed is:

1. A radiation window manufacturing method, comprising:
   patterning a mask on a top surface of a bulk wafer or compound wafer;
   etching the bulk or compound wafer from the top surface, based on the mask, either by timed etching of the bulk wafer, or until an inner insulator layer of the compound wafer, thereby generating recesses in the bulk or compound wafer;
   filling the recesses, at least partly, with a filling material, polishing the top surface of the bulk or compound wafer, and providing a membrane layer on the polished top surface, and
   etching the bulk or compound wafer from a bottom surface, opposite the top surface, to build a supporting structure for the membrane layer in accordance with a shape defined by the mask.

2. The method according to claim 1, wherein the compound wafer comprises two sub-wafers bonded together, at least one of them having the insulator layer thereon.

3. The method according to claim 1, wherein the insulator layer comprises at least one of: a silicon oxide layer, a silicon nitride layer and an aluminium oxide layer.

4. The method according to claim 1, wherein sub-wafers comprised in the compound wafer are comprised of at least one of the following: silicon, glass and carbon fibre.

5. The method according to claim 1, wherein the recesses are completely filled with the filling material.

6. The method according to claim 1, wherein the filling material comprises a low-temperature material or a high-temperature resistant material.

7. The method according to claim 1, wherein the filling material comprises at least one of: silicon oxide, polysilicon, silicon nitride and spin-coating materials.

8. The method according to claim 1, wherein the membrane layer comprises silicon nitride, boron nitride or silicon carbide.

9. The method according to claim 1, wherein upon polishing the top surface of the bulk or compound wafer, grooves are formed in corners of the recesses, where the membrane layer and material of the bulk or compound wafer will meet.

10. The method according to claim 1, wherein a separation layer is provided by thermal oxidation or conformal coating to cover edges of the recesses, and wherein the supporting structure is made of the filling material, enclosed for example in silicon oxide or aluminium oxide.

11. The method according to claim 1, wherein the etching of the compound wafer from the top surface extends partially into a thickness of the insulator layer, and wherein the insulator layer is used as a buried mask in the building of the supporting structure.

12. The method according to claim 1, wherein the etching of the compound wafer from the top surface extends through a thickness of the insulator layer, and wherein the insulator layer is used as a buried mask in the building of the supporting structure.

13. The method according claim 1, wherein the etching of the bulk or compound wafer from the top surface extends to a certain depth of the bulk wafer, or extends through a thickness of the insulator layer of the compound wafer, and a separation layer is provided by conformal coating, e.g. thermal oxidation of silicon to cover edges of the recesses, and the separation layer coats the supporting structure.

14. A radiation window construct, comprising:
a radiation window comprised of a membrane layer, and
a supporting structure built of a bulk wafer or a compound wafer, wherein the radiation window construct has been manufactured using a process wherein a filling material has been provided to fill etched recesses in the bulk or compound wafer, wherein grooves are created in corners of the recesses where the membrane layer and material of the bulk or compound wafer meet when polishing the top surface of the bulk or compound wafer, wherein grooves are present in corners of the recesses where the membrane layer and material of the bulk or compound wafer meet.

15. The radiation window construct according to claim 14, wherein the membrane layer comprises silicon nitride, boron nitride or silicon carbide.

16. The radiation window construct according to claim 14, wherein the supporting structure is made of the filling material, enclosed in separation material, e.g. in silicon oxide.

17. The radiation window construct according to claim 14, wherein an inner oxide layer of the compound wafer coats the supporting structure.

18. The radiation window construct according to claim 14, wherein a separation layer, applied during manufacture to sides of the recesses, coats sides of the supporting structure.

19. An x-ray detector comprising a radiation window construct in accordance with claim 14.

* * * * *